(12) United States Patent
Motsenbocker et al.

(10) Patent No.: US 6,571,722 B2
(45) Date of Patent: Jun. 3, 2003

(54) COMPUTER CONTROLLED WATERCRAFT

(75) Inventors: Marvin A. Motsenbocker, Fredericksburg, VA (US); Kayo Motsenbocker, Fredericksburg, VA (US)

(73) Assignee: Maruta Electric Boatworks L.L.C., Fredericksburg, VA (US)

( * ) Notice: Subject to any disclaimer, the term of this patent is extended or adjusted under 35 U.S.C. 154(b) by 0 days.

(21) Appl. No.: 09/927,640

(22) Filed: Aug. 13, 2001

(65) Prior Publication Data

US 2002/0088387 A1 Jul. 11, 2002

Related U.S. Application Data

(63) Continuation of application No. 09/561,972, filed on May 1, 2000, now Pat. No. 6,273,015, which is a continuation-in-part of application No. 09/252,038, filed on Feb. 18, 1999, now Pat. No. 6,073,569.
(60) Provisional application No. 60/076,002, filed on Feb. 26, 1998.

(51) Int. Cl.[7] .................................................. B63B 1/00
(52) U.S. Cl. .............................. 114/61.1; 440/1; 440/6
(58) Field of Search ............................ 114/61.1; 440/6, 440/1, 84

(56) References Cited

U.S. PATENT DOCUMENTS

| | | | | |
|---|---|---|---|---|
| 3,902,444 A | * | 9/1975 | Stark ........................... | 114/275 |
| 4,319,844 A | * | 3/1982 | Auger ........................ | 356/399 |
| 4,510,923 A | * | 4/1985 | Bronstein ................... | 126/696 |
| 4,596,238 A | * | 6/1986 | Bronstein ................... | 126/684 |
| 4,597,377 A | * | 7/1986 | Melamed .................... | 126/600 |
| 4,819,730 A | * | 4/1989 | Williford et al. ........ | 114/144 B |
| 4,988,885 A | * | 1/1991 | Lindstrom ................. | 250/239 |
| 5,467,257 A | * | 11/1995 | Shalvi ........................ | 362/183 |
| 5,575,703 A | * | 11/1996 | Stearns ....................... | 449/13 |
| 6,167,829 B1 | * | 1/2001 | Lang .......................... | 114/272 |

* cited by examiner

Primary Examiner—Stephen Avila

(57) ABSTRACT

New electric boat designs are provided that exploit the weight of a battery to stabilize the boat and in some cases to overcome the hull speed limitation problem. The battery mass is enclosed in one or two torpedo-like structures that are mostly or completely submerged. A platform is spaced above the torpedo(s) via one or more struts that may allow wave energy to pass through the watercraft rather than collide with large vertical surfaces. The design minimizes wake formation, wave sensitivity and is useful for new kinds of electric boats that can dive with an air bubble to allow submarine use, higher speed pleasure craft, and sailing craft that can remain stable in shallow draft waters. The stabilized watercraft optionally have computer monitoring of wave activity and control for greater resistance to adverse weather conditions.

18 Claims, 9 Drawing Sheets

510

COMPUTER CONTROLLED WATERCRAFT

This application is a continuation of application Ser. No. 09/561,972, filed May 1, 2000, now U.S. Pat. No. 6,273,015, which is a continuation in part of application Ser. No. 09/252,038 filed Feb. 18, 1999, now U.S. Pat. No. 6,073,569, which receives priority from provisional application No. 60/076,002 filed Feb. 26, 1998.

FIELD OF THE INVENTION

This invention generally relates to watercraft and more specifically to electric watercraft and control systems for stabilizing watercraft.

BACKGROUND OF THE INVENTION

One problem with the concave "vessel" design of watercraft is that excess watercraft volume is required above the water line to accommodate weight shift and to prevent catastrophic failure from water spilling into the vessel. That is, an open displacement vessel must have a large volume that increases from its bottom to top and that presents a vertical or concave shape, which creates a maximum of friction at the water surface. Such a concave hull efficiently transmits and receives energy to and from the water surface. The hull loses energy to the water and creates a wave (wake) simply by moving. The wake increasingly impedes boat movement as the boat acquires velocity, and becomes a standing wave at what is known as a limiting "hull-speed." Conversely a displacement vessel absorbs wave energy and is easily rocked by waves. Because of this sensitivity to waves a traditional "personal" watercraft that typically is less than 30 feet long, and particularly less than 25 feet long often cannot be used in the ocean when large waves are present. To overcome the large wave problem, a vessel type of watercraft simply is made larger. However, this solution is impractical for personal watercraft, especially trailorable watercraft that are limited in size by the dimensions of vehicles that can travel behind a car or truck on a highway.

The drawbacks of the traditional vessel displacement hull design are worsened when combined with electric propulsion systems. Boats that rely on rechargeable batteries, (which includes fuel cells in this context) have to carry a heavy and bulky power source. The great weight of the power source requires yet a larger hull to displace a larger volume of water to keep the boat afloat. This interferes with hull streamlining and can make the boat larger to accommodate the power source. Thus, the development of electric watercraft technology in particular is hindered by the vessel hull problem. In fact, the vessel hull drag prevents economical use of electric motors that utilize batteries for even moderate speed (above 8 mph) boating. This unfortunate state of affairs is a well known problem with electric boats, as, for example, stated in DOUGLAS LITTLE, ELECTRIC BOATS, THE QUIET HANDBOOK OF CLEAN, QUIET BOATING, (International Marine, 1994) on page 33 (referring to propeller design): "In the case of the electric boat, high speed—above 10 mph—is one factor that can be dropped immediately." Clearly, new designs are needed for wide acceptance of electric boats as general-purpose personal watercraft.

There is no comprehensive combination approach to this problem that plays off some disadvantage(s) of using heavy batteries or other low energy density power source with other disadvantage(s). In particular, no design strategy has successfully exploited the large mass and volume requirement of electric (including fuel cell) batteries as an asset, instead of a demerit, in a boat structure. Finally, there is no sufficient design for an electric powered and trailorable watercraft that can withstand moderate wave activity such as 2 feet high waves, without requiring a large vessel that cannot easily be pulled behind a car. A solution to these problems would open up new areas of boating to those that cannot buy or use the much greater size boats needed during moderate wave activity.

SUMMARY OF THE INVENTION

The inventors discovered a way to exploit the heavy battery problem in an electric boat design that simultaneously (i) allows use of massive battery power for a small watercraft, (ii) stabilizes the watercraft, partly by decreasing its center of gravity, (iii) decreases resistance to wave action and (iv) decreases friction to boat movement. From this discovery, the inventors have discovered new types of electric watercraft having advantages of high speed operation (above hull speed), diving capability, for example with an air filled chamber, and sailboats having low center of gravities but that can enter shallow waters.

Pursuant to their investigation, the inventors also discovered that arranging one or two primarily submerged closed hulls with at least one surface piercing strut works poorly for a personal watercraft but that they could make the platform shorter or add one or two floating skis to provide the needed stability. That is, while studying how to overcome the problem of transmitting and receiving surface energy, new features and modifications were found that improve watercraft by exploiting the advantage of using a heavy power source.

In one embodiment, the invention is an electric powered watercraft capable of exceeding its calculated hull speed, comprising at least one elongated submerged support member having convex upper surfaces and at least one strut attached to the upper surface, a propulsion unit and a low energy density power source within the at least one support member, at least one float having at least one strut attached to the upper surface, and a platform attached to and positioned above the top of the struts from the support member(s) and float(s).

In another embodiment the invention is an electric powered watercraft capable of both cruising at the water surface and diving, comprising two elongated submersible support members with at least one strut attached to the upper surface of each support member, a propulsion unit and a low energy density power source within each support member, and a platform attached to and positioned above the struts of the support members, the platform comprising a cabin with an opening at its bottom that allows divers to enter and exit the cabin at ambient pressure, wherein at least the top of the cabin is held above the water surface during cruising at the water surface and the entire cabin submerges during diving.

In yet another embodiment the invention is a non-vessel type watercraft less than 40 feet in length, comprising at least one support member having at least one strut at its top surface, a platform attached to the strut of the support member and held above the support member by a distance, and a means for preventing submersion of the platform. In related embodiments the means for preventing submersion of the platform is selected from the group consisting of: a horizontal rudder operably connected to a movable deflector, the movable deflector affixed to the watercraft above the waterline; a passive mechanical force deflector affixed to the front half of the watercraft and that automatically pulls the front of the watercraft up upon collision with waves; a bow-mounted propeller having a thrust that inclines and that is controlled by a submersion monitoring system; monitoring watercraft depth electrically or optically and compensating by stopping the watercraft, decreasing the watercraft speed, shifting weight distribution in the watercraft and/or steering the watercraft to compensate the detected vertical movement; an inclined surface at the leading edge of the platform that forces the watercraft up upon collision with the water; and floatation material within the platform.

In another embodiment the invention is a watercraft that comprises a computer that monitors the attitude of the watercraft and/or wave activity by gathering data concerning water movement detected with respect to a position on the watercraft via an electronic device. In particular embodiments, the data is gathered from at least 3 positions on the watercraft and used to obtain both speed and direction information for wave activity. In yet another embodiment the invention is a software implemented method that uses such sensor information to determine water surface conditions, and may even determine the development of storms, and use that information to guide the boat away from storm activity.

In another embodiment the invention is an enhanced solar reflector that uses a surface of reflective material to enhance solar panel electrical output while minimizing interaction of wind with the solar reflector. In specific embodiments thereto, the reflector comprises slats that rotate to optimize collection of solar energy from a moving sun, in an embodiment the slats respond to wind gusts by moving into a position that allows easier wind passage through the reflector, and in another embodiment the reflector comprises a porous fabric.

In another embodiment the invention is a houseboat less than 45 feet long that has a low center of gravity and which can cruise on the ocean.

Other embodiments will be appreciated from their descriptions in the specification.

BRIEF DESCRIPTION OF THE DRAWINGS

FIG. 6a is a side view and

FIG. 6b is a front view.

DETAILED DESCRIPTION OF THE INVENTION

Figure 1:
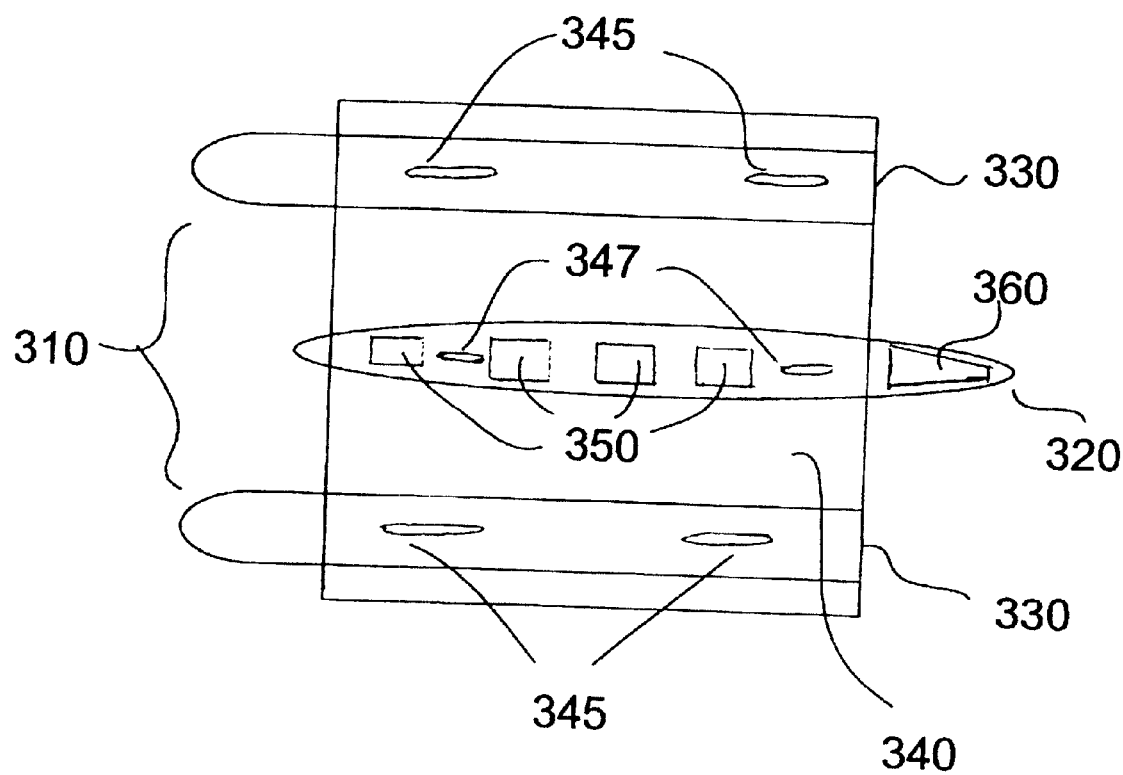
FIG. 1 is a top view of a watercraft having a single support member with two lateral floating skis.

The inventors have searched for boat hulls that do not present a concave or vertical shape at the water surface and realized why such hulls are not popular for personal watercraft. Conceptually simple, the open hull design watercraft has a large reserve buoyancy volume that allows dramatic changes in loading of a personal watercraft while moving. This buoyancy volume, however, requires a large hull that must be vertical or concave at the water surface. That is, vessel watercraft generally are bigger above the water surface than below, and this feature encourages transfer of energy to and from the water surface. Furthermore, pontoon watercraft have this problem. In reviewing the SWATH design as for example, described in U.S. Pat. Nos. 5,694,878, 4,763,596, 4,986,204, 3,830,178, 3,897,744, and 4,944,238 as an alternative, the inventors discovered that those ships are very large with platforms that extend generally above the total lengths of their support members and furthermore, are top heavy. Thus, the SWATH design was found to have limitations for use in small watercraft, partly because a passenger standing on a platform that already is spaced above the water surface unacceptably increases the watercraft's center of gravity, as the inventors learned to their chagrin during experimentation.

The inventors discovered that they could alleviate these problems by placing heavy batteries such as lead acid, alkaline, metal hydride, lithium, nickel cadmium, hydrogen fuel cell, etc. within an enclosed, elongated convex hull, and then combine at least one such hull, which sits low or completely in the water, with one or more features outlined herein for improved watercraft stability.

The inventors studied the use of mostly submerged support members and learned, for example, to combine the support member(s) with a shortened platform and/or floating skis for stability. In the case where batteries are placed in a single support member, the inventors discovered that good performance is achieved by combining the single support member with at least one, and preferably two floating skis positioned lateral to the support member. When the single support member is low in the water and contributes to a low center of gravity, it advantageously may be combined with 2 floats such as pontoons preferably having convex surfaces, instead of 2 skis to provide positive buoyancy. In this case the support member preferably is more than 90% submerged and more preferably 100% submerged, with the top below the water surface by a distance to minimize wake formation. The submerged distance when desired, is limited to the total desired draft of the watercraft but may be up to the maximum support member diameter times 1, or, for deeper water operation, up to the diameter times 3, to minimize wake formation.

Combined Features: (a) Heavy Power Mass Within a Closed Support Member Spaced Below the Water Surface Via at Least One Strut and (b) Shortened Platform and/or Floats Such as Skis for Stability (a) Use of Low Energy Density Power Mass for Stability According to an embodiment of the invention, a low energy density power source that represents a large proportion (more than 10%, preferably more than 20%, more preferably greater than 25% more preferably greater than 35% and even more preferably greater than 50%) of the total watercraft weight is placed within at least one closed hull support member having a convex surface, and a platform holding the occupants (or other cargo) are held above the support member(s) by at least one strut. This feature of the invention minimizes contact of watercraft surfaces with wave energy by: (1) presenting a convex shaped surface at the top of each support member such that this top surface approaches a horizontal and interacts little with wave motion; and (2) attenuating or allowing waves to pass through the craft by placing the non-submerged portion of the watercraft on one or more struts having less vertical surface than a regular vessel type hull to interact with water, such that the strut(s) maintain space between the top surface of the submerged support member and the bottom surface of the platform.

A strut connected to a support member may be elongated along the length of the support member or float to which it is attached. In an advantageous embodiment a long strut attaches a central support member to the platform and comprises a continuous horizontal surface, particularly if laterally arranged floating skis are present, which can break waves before they can reach the vertical surface of the long strut. This arrangement minimizes sensitivity to waves. The submerged support member(s) furthermore are elongated and shaped to alleviate surface wave formation and further optionally contain(s) the motor/propeller that operate in the same vector as the axis of the support member, and do not separately disturb the water.

The feature of placing a massive energy source in a support member/propulsion unit below the platform may assume one of two basic conformations to exploit the large mass to stabilize the craft. In the first conformation, two support members are used that preferentially are not completely submerged but have positive buoyancy, hereafter-termed "Double Support Member Configuration." In the second, one support member is used that is completely submerged and is combined with floating skis for lateral stability, hereafter termed "Single Support Member Configuration." The single support member configuration is preferred for embodiments discussed herein. The double support member configuration is preferred particularly for a diving boat that can submerge, in which event the support members should be reversibly ballasted to allow floatation in one condition (air inside support member) and to allow diving after removal of some or all of the air from the support members.

(b) Shortened Platform and/or Floats Such as Skis

A watercraft according to an embodiment of the invention has a length that is small with respect to an occupant and in the most preferred embodiment is 2, 3, 4 or up to 5 times as long compared to the height of a 6 foot tall occupant, that is, up to 30 feet long. A platform according to preferred embodiments is shorter than the length of the support members, as shown in the figures. In one embodiment the platform is shorter on both its fore and aft sides above the support member(s) by at least the distance of the mean support member length. By way of example, if two support members 25 feet long are used with 1-foot long struts, then the platform (passenger load bearing surface) would be no more than 23 feet long. The platform may have further rigging or decking area that may lengthen the platform beyond these dimensions, particularly for larger craft greater than 20 feet long, and particularly greater than 25 feet long. Such additional rigging is not designed for a solid infrastructure such as a room, and normally occupants would not walk there.

In another embodiment, the platform is shorter by twice the mean strut length or, according to this example, no more than 21 feet long. In yet another embodiment preferred for more rugged craft the platform is shorter by thrice the mean strut length or, no more than 19 feet long in this example. The term "mean strut length" as used here means the average spacing between the support member(s) and the platform, the spacing being created by the struts. The actual platform dimensions should reflect the anticipated passenger load and weights such that if a tall person is allowed to move freely throughout the platform area, that area should be made smaller, particularly in the fore and aft dimension. In some embodiments however, the platform may be as simple as a chair that holds one person and the stability may be increased by limiting the motion of the occupant.

According to another embodiment, instead of or in addition to limiting the platform size, at least one float such as a ski or pontoon is included parallel to the support member(s) for increased stability. In this context, one or more skis are preferred where high speed is desired. In such case the support member(s) should provide some buoyancy for the platform. When high speed is not a concern, such as for a houseboat, a single support member, particularly with strong net negative buoyancy may be combined with two lateral floats such as pontoons that do not hydroplane readily at higher speed.

In yet another embodiment the platform includes a non-load supporting portion at the front and/or at the rear that may extend up to or even beyond the support member. The term "non-load supporting portion" in this context means that an occupant cannot walk on the portion and that the portion is not subjected to other non-permanent heavy masses. A non-load supporting portion at the front is preferred having a wedge shape. The point of the wedge is away from the platform and provides a streamlined frontal surface to decrease wind friction. The non-load bearing wedge provides storage for light weight materials such as fishing poles, life preservers and the like. In a preferred hybrid gasoline electric cruise boat embodiment, the non-load bearing wedge comprises a small gasoline generator with a gas tank. In this case the generator and tank may be centrally placed to maximize stability and they typically have a total mass that is much less than the battery mass.

If one support member is used, two floating skis, one on each side of the support member is preferred. In yet another embodiment one support member is combined with one floating skis, which may be located on a side determined by the rotation of the propeller within the support member. If the rear mounted propeller rotates clockwise (viewed from the rear) for forward boat movement, the support member will tend to twist counterclockwise and the floating ski is positioned to the left of the support member. If a propeller is chosen that rotates counterclockwise then the floating skis is positioned to the right of the support member.

The support member preferably has lateral fins. The fins help stabilize the craft by resisting rotation of the support member(s) during wave activity in response to a vertical force exerted onto a floating skis.

For an application where the watercraft is used to ferry significant loads, each ski preferably has a flat bottom and provides flotation to the platform when the watercraft is at rest. Preferably, the support member provides some buoyancy and each skis provides less than 35%, more preferably less than 20% and even more preferably less than 10% of the buoyancy that holds the platform (plus the passengers/cargo) above the water surface when not in motion. A minimum percentage of skis buoyancy is most preferred when little wave activity is present and in any event is desired to allow for minimum sized skis. During forward motion, the skis should skim on top of the water surface, and the skis provide greater stability.

In one embodiment the skis, although buoyant, do not contribute appreciable buoyancy to the platform and the completely submerged support member provides the force. When manufacturing cost is acceptable, the support member (or float) buoyancy may have built in plumbing to allow buoyancy control by pumping air or water in or out of it.

This can provide greater mass to the support member or float during rest than during motion. During operation according to the latter embodiment, the support member buoyancy and/or the floating skis' buoyancy preferably is increased immediately prior to or during initiation of forward movement. During high wave activity, the support member and/or the floating skis buoyancy preferably is decreased by ballasting with water to enhance stability.

In one embodiment, the platform is buoyant and contacts the water when the watercraft is not moving. During forward motion the skis, which have upwardly curved tips, climb up on top of the water surface, allowing the platform to exit the water and ride above the water surface. This embodiment is preferred for a dive boat configuration where it is desired to minimize the air ballast space within the support members.

Where higher speed is desired, the skis may impart stability mostly during motion, in which case the skis would have little floatation of its/their own. In one such embodiment two support members are used to provide flotation and stability while not in motion but are submerged during motion, at which time the skis ride on top of the water surface. Laterally arranged skis, which optionally are retractable, can provide further stability during motion. Such skis are particularly useful for the diving boat shown in FIG. 2 because they allow greater mass and smaller air ballast tanks in the support members. A particular challenge with the diving boat shown in this figure is that the boat must have much mass in order to submerge the enclosed platform, which contains an ambient pressure (not pressurized hull) air chamber for breathing. The buoyancy of one cubic foot of air requires about 65 pounds of net mass in the support member(s) to submerge. The air chamber (cabin) of the diving boat shown here preferably has more than six cubic feet of air and more preferably more than 10 cubic feet of air. Accordingly the support members require at least 390 pounds or 650 pounds respectively of net negative buoyancy just to get the cabin below the water surface. In the embodiment where the support members need to hold the cabin weight above the water surface when not diving, even more exchangeable air ballast buoyancy is required.

Such watercraft preferably has non-floating water skis that help the watercraft platform climb on top of the water despite that fact that the watercraft has little buoyancy due to the massive weight from the power supply mass (battery) along with optional ballast such as lead or iron that allows submersion with the air filled compartment. In one embodiment however, the dive boat additionally has one or (more preferably) two floating skis or pontoons that are inflatable or that have inflatable portions that help lift the platform out of the water when not diving.

The Double Support Member Conformation:

In this conformation, the support members contain heavy power sources and ride low in the water. To help stabilize the watercraft against wave action, at least 35% of the support member(s) containing the power source should be below the water line. Preferably, at least 50% is submerged and more preferably more than 65% and even more than 85% is submerged. The principal limit to submersion according to one embodiment is that a small reserve of buoyancy is required to resist sudden weight shifts in the watercraft (such as in the platform). However, if a satisfactory means of preventing accidental submersion of the platform is used (as, for example, described herein) at least 90%, and even complete submersion of the support members is preferred to alleviate the generation of surface waves.

The Single Support Member Configuration:

According to another embodiment of the invention substantially (more than 50%) or all of a support member is submerged, and the watercraft further comprises at least one floating ski for stability, as described below. When one floating skis is used, the support member preferably is submerged about 50% and contributes at least half of the total buoyancy, the skis contributing the remainder. When two skis are used, the support member preferably is completely submerged, as shown in FIG. 1. In either case, the support member contains batteries, preferably a propulsion unit and optional reserve buoyancy to hold up the platform. The support member is attached beneath the center of the platform in FIG. 1, and beneath one side of the platform for the single skis configuration. The float(s) may contain propulsion unit(s).

In both single and double support member configurations, one or more struts, which hold up the platform, allow the platform to ride above the water. The platform may be as small as a chair but, particularly for larger craft used to ferry cargo, may resemble a flat surface.

Exploit the Features with Further Combinations

Preferably, additional features of the invention are combined in a watercraft to take advantage of the large weight of the power mass and further stabilize the watercraft, as reviewed in items A through M below.

A. Propeller Placement Within the Support Member

Another advantageous feature is placement of a propulsion unit or units inside the long axis of the support member(s) such that its propeller (or water impeller or other means of moving the watercraft) disturbs water in the same vector and same location as the submerged portion of the watercraft as shown in FIG. 1. Electric boat propulsion is particularly well suited for this embodiment because an electric motor does not require air and can be cooled by water contact.

B. Automated Buoyancy Compensation

The amount of submersion and the degree of tilting (attitude) of the support member and/or struts can be detected automatically and controlled by a buoyancy compensator. Sensing of the "tilting" means determining whether the watercraft's attitude is improper (e.g. the bow being lower than the stern during forward movement). Watercraft buoyancy preferably is controlled by adding or removing air from the submerged portion, or by adding weight to the watercraft, or both. One advantageous embodiment is to include an air bag in the submerged portion and to transfer air between this bag and the atmosphere as needed to control watercraft submersion. In one embodiment, air is added to the support member(s) before or during forward motion and removed later. Alternative means are described below.

C. Hydrodynamically Shaped Support Member(s)

To minimize water disturbance the support member may be in the shape of a log, or more preferably, a cigar as shown in the figures. Most preferably, the support member should have a contoured surface throughout, to minimize boundary layer detachment and cavitation at higher speeds, such as above 10 miles per hour. One preferred shape in this context is a rounded central portion tapered along a well known curve as, for example shown in U.S. Pat. No. 5,514,023 the contents of which are herein incorporated in their entirety by reference A more preferred shape in this context is an elongate projectile as described in U.S. Pat. No. 5,514,023, having a length to diameter contour that facilitates stable and efficient travel through water. Table one from this patent describes representative diameter to length ratios expressed as diameter vs. distance from the projectile's leading edge along the projectile's long axis. The preferred projectile shape is symmetrical with a slight forward bias of the region of maximum diameter to compensate for the weight of the fins, where the maximum diameter of the body is located $\frac{1}{16}^{th}$ of the overall length forward of the center as described in column four of that patent. In a most preferred embodiment according to the present invention, this same shape is used for one or more support members, which have one or more, particularly at least 2 fins, at the rear of the support member. Preferably the center of maximum diameter is located between $\frac{8}{16}^{th}$ and $\frac{7}{16}^{th}$ of the distance from beginning to end of the support member rather than $\frac{7}{16}^{th}$ shown in the patent because the fins of the present invention should be smaller and/or fewer than the fins shown in U.S. Pat. No. 5,514,023.

The stabilizing fins, if present on a support member, preferably occupy less than 25% of the body length and preferably extend out from the surface no more than the maximum diameter of the support member. The fins provide stability against undesirable rotation of the support member, and thus help stabilize the watercraft, particularly from wave motion from the sides.

A support member may comprise a screw propeller that extends from a surface that is roughly continuous with the curvature of the support member which it comprises and that does not extend out more than the maximum radius of the support member at its largest radius, in order to minimize the water disturbance. In other words, the screw propeller has a hub or central body that is continuous with the support member. The part(s) of the propeller that stick out of the water extend from this continuous surface. More preferably, the screw propeller focuses water at a point immediately to the rear of the propeller axis. In other words, the propeller gathers water near the immediate area of the support member surface and creates a higher pressure immediately to the rear of the support member, where the rushing water that travels along the support member surface tends to come together. For example, a hull tapered along a suitable curve and which has a maximum diameter of 20 inches would be matched with a screw propeller having a hub that fits this same curved hull surface. In this case the fins may extend up to 20 inches diameter with respect to the turning axis.

For best stability, two or more members should be used parallel to each other. Each member preferably has a taper or increase in diameter from the anterior point (leading edge) towards the central portion, and a gradual decrease in size or taper from the central portion to the posterior point (trailing edge) as described above. Preferably, the posterior point has a diameter approximately equal to the motor diameter, and a motor is present at this point in each member. In such case, a propeller is preferred that focuses the expelled water to a focal point directly behind the long axis of the support member. Since a small portion of a support member may be desired above the waterline, the top center of the member along its long axis may be slightly raised, as mentioned above under "convex surface," to provide some reserve buoyancy.

In a preferred embodiment the propulsion unit is an impeller within a housing. The housing includes fins or other suitable structure near the water intake region to prevent or limit direct contact of the impeller with a swimmer. Artisans skilled in jet skis design are particularly familiar with such impellers and structures, such as exemplified in U.S. Pat. Nos. 5,549,451, 5,332,355 and 5,266,009.

D. Shaped Strut(s) to Minimize Wave Interaction

Strut(s) of the present invention are attached to support member(s) to hold up at least one platform such as a chair or flat surface such as a photo voltaic array. Strut(s) typically extend from a support member by at least 6 inches, preferably between 1–3 feet, and could be more than 6 feet in large bodies of water. However, it is best to keep the distance short to maintain a low center of gravity. Preferably the center of gravity is lower than the center of buoyancy. Telescoping struts may be used to lower the center of gravity as needed.

The strut(s) are designed having minimum cross sectional surface area to present a smaller target for wave action. Preferably, a strut is a pole or fin with a leading edge for lower friction during movement. In one embodiment the struts preferably have an average diameter (i.e. thickness perpendicular to the direction of forward movement) that is less than 5 times the vertical distance between a submersible member and the platform. In another embodiment a strut is very long and extends forward and aft by a distance that may exceed the vertical distance (height) of the struts. In this case too, the mean diameter of the strut(s) (thickness with respect to the direction of motion of the watercraft) preferably is less than 20% of the strut height. However, in another embodiment a strut may be both thick (greater than 20% of the strut height) and long.

Preferably the strut(s) do not run along the entire length of the support member(s) but allow appreciable wave energy to pass through the watercraft. In one embodiment a continuous-strut exists on most of but not the entire length of a central support member. For example, the two struts 347 in FIG. 1 may be connected together to form a continuous strut on support member 320. On each side of support member 320 is a parallel floating skis. Each skis is attached to the platform by one or more struts that allow some wave motion to pass over the skis. Furthermore, each support member shown in the diving boat example of FIG. 2 preferably has a continuous length of strut 55 for strength. However even in that case the strut does not extend above the entire length and some wave motion manages to pass through.

The "vertical" arrangement of the struts allows the struts to hold the platform out of water. One or more struts can extend away from a perfect vertical. For example a swept back design similar to a shark's fin and consistent with streamlining is acceptable. It is desired that the strut(s) hold the upper unit above the support member(s) such that most of the wave action energy does not collide with and become absorbed by the platform. Preferably, strut length exceeds one half of the maximum anticipated wave height. For use in the ocean, most preferred is a strut(s) that are at least 2 feet long, more preferably at least 3 feet long and most preferably for use in latitudes far from the equator (or in strong storms) where waves are larger, at least 4 feet long E. Movable Struts In one embodiment the strut(s) can be extended automatically or manually. Such extension or retraction may be telescopic in response to wind and/or wave conditions and can alter the center of gravity to become close to or lower than the center of buoyancy during rough water conditions. Such extension or retraction also is desired when loading or unloading the platform, to match the elevation of a dock. Buoyancy of the support member(s), in a related preferred embodiment, is controlled to match the elevation of a dock. In extreme cases both support member buoyancy and strut length are altered to control platform elevation.

F. Combine With a Means to Prevent Platform Submersion

Preferably a means is provided to prevent the watercraft from dipping into the water (diving) while moving. For example, when cruising, a sudden movement by an occupant towards the front of the watercraft might submerge the watercraft further than desired. The means described herein are intended not only for electric watercraft but for other watercraft as well, particularly those that lack a vessel hull and need special protection against immersion.

Submersion of the watercraft platform can be prevented during normal, non-diving use by adjusting the buoyancy such that the watercraft is positively buoyant after loading to handle sudden shifts in weight. Protection against undesirable submersion also can be prevented by other means, such as controlling the attitude of the watercraft during movement, with a horizontal rudder as exemplified in FIG. 5, with a passive deflector as exemplified in FIG. 6, or with a bow-mounted propeller having a thrust that inclines.

Other means to control sudden or gradual movement down into the water are contemplated and a representative sample is presented here. One means is to monitor for changes in watercraft depth and compensate either by stopping the watercraft, slowing the watercraft, shifting weight distribution in the watercraft, or steering the watercraft to compensate the vertical movement.

Watercraft depth (or changes in angle of attack, which lead to changes in watercraft depth) can be detected. Wave activity, which presages or indicates storm activity also can be monitored. Preferred methods use electronic means. For example continuous monitoring of depth can be carried out galvinometrically, i.e. by measuring conductivity between vertically arranged electrodes on one or more struts. When the water level rises, either by immersion, or by high wave activity, such immersion or high wave activity can be electronically detected by changes in conductivity between the electrodes. A change in conductivity is translated into a voltage and/or current difference and then is converted into a signal (typically "on/off" or a more complex digital series of ones and zeros obtained from an analog to digital converter) and then input into a computer. Another electronic detection means is the use of optics to determine submersion, distance of the platform from the water surface or frequency of wave activity by optical reflection and/or optical transmission measurements. Photodiodes and photodetectors are preferred for this embodiment. Yet another electronic means is the use of ultrasonic waves by pairing an ultrasonic wave generator with a detector, as is done in motion detectors. In the simplest case, the computer compares a new signal with either a stored signal or fixed signal value and then outputs a result to control a means for adjusting the watercraft attitude or depth. Preferably, a number of signals are compared and an algorithm is used to decide how to adjust watercraft movement.

Watercraft according to the invention interact much less with the water surface compared to a regular vessel type boat and therefore disturb incoming wave activity much less, allowing their detection and measurement. This advantage of the invention opens up new vistas for monitoring storm activity and providing back wave activity information either manually by a display, or automatically by control mechanisms. Such information can be used to increase watercraft survival during a storm (by for example steering into waves) or to avoid future storm activity by traveling away from a a nearby storm (the presence, direction and movement of which can be determined from wave activity as described for example in manuals such as Modern Seamanship, authored by Don Dodds (Lyons & Burford, 1995). Accordingly, the computer optionally gathers wind information and can use this in an algorithm to control the watercraft.

In a preferred embodiment the computer has a stored program that compares a series of electronic measurements obtained over a period of time and after comparison, outputs a response. The response may be a visual signal to an operator and may be an automatic correction of boat speed, depth, direction or attitude. Still more preferably the computer receives input from at least two locations of the watercraft and uses an algorithm to determine wave height, wave speed and/or wave direction. For example, a detection (electrical output measurement) can be made at three locations on the watercraft, a front starboard position, a front port position and rear position. A wave that comes directly from the front center will be detected at about the same time by both front sensors and is later detected by the rear sensor. More preferably a fourth sensor is used, with one at each of four corners of the watercraft.

A computer can compare the time between signals to determine the relative speed and duration of a wave, and monitors boat speed to correct for the fact that the boat itself is moving in the water. For example, in the three sensor embodiment mentioned above, a wave from dead ahead is detected by virtue of both sensor signals being received at about the same time and the rear sensor signal being received later than either front signal (after correcting for boat movement). Each possible combination (waves at various speeds coming from any direction) may be similarly detected and then compared by a program in the computer, which then outputs a signal designed to steer the craft more into the wave to limit wave disturbance or make other adjustments as may be desired. For example, to increase stability during a storm, if the sensor output indicates waves that come from the front right the computer would output a signal that changes the rudder to steer the watercraft more towards the right.

Preferably at least four sensors are used, one at each of four corners of the watercraft. More preferably sensors are used that also monitor wave height. The wave height, along with wave speed, wave direction and preferably wind direction can be analyzed by an algorithm to adjust boat trim, speed or direction as suited for a particular situation. The information may be manually used by skilled seaman to respond to conditions as is discussed for example in manuals such as Modern Seamanship, authored by Don Dodds (Lyons & Burford, 1995). More preferably, the computer itself controls the boat speed and direction in response to the sensed information.

A skilled artisan can easily optimize electrode and optic arrangements as well as determine suitable algorithms to decipher patterns of electrical conductivity or light measurements as representing longer-term submersion versus regular wave activity. Conductivity or optic measurements can be conducted at various locations, for example, on the same strut, between electrode(s) on a strut and a submersible member, and between two different struts. By obtaining a large amount of data, a computer can determine whether to shift ballast to compensate, adjust motor speed, adjust motor thrust vector (rotate motor to thrust more down or up), adjust a rudder to control vertical position in the water, and the like.

Other means to control the watercraft, such as altering submersion depth do not require monitoring waves or changes in watercraft depth. For example, a mechanical force deflector can be used that hits the water surface at an angle when the watercraft submerges too far and automatically corrects watercraft attitude. FIGS. 6*a* and 6*b* show a mechanical force deflector attached to a strut. In this preferred embodiment, the force deflector is near the front of the watercraft. In another embodiment, this force deflector swivels and is linked, electronically or mechanically (FIG. 5), to a horizontal stabilizer such that when it hits the water, the stabilizer compensates by forcing the front of the watercraft up.

Yet another means to control submersion depth is to include sufficient buoyant material in the bottom of the platform. According to this embodiment when the platform contacts the water, it acts as a float.

Yet another means to prevent undesired submersion is to use a horizontal stabilizer, fins or hull design that constantly forces the watercraft to submerge during forward movement of the watercraft. When the watercraft stops, this downward force also stops, and the watercraft drifts up. This means is particularly useful for the double support member design wherein the support members become completely submerged during travel. In this case, a second means is desired to prevent platform submersion, preferably selected from the means described here.

Yet another means is to include two water skis, that optionally are retractable and which are used during forward motion to maintain the watercraft platform substantially above the water.

In practice, a combination of controls are preferred for ensuring that the watercraft does not completely submerge. For example, a platform that contains buoyant material, and a vertical rudder linked to a force deflector can be used simultaneously. Of course, a preferred means of preventing unwanted complete submersion is through buoyancy adjustment of one or more support members. Typically, an air bladder, or hollow compartment of the support member contains traps air, and the amount of air is adjusted to provide a desired level of buoyancy.

Use of a means to prevent submersion of the platform allows greater submersion of the support member(s) during normal use. Accordingly this feature allows use of a smaller boat (having less flotation) in comparison with that of regular open vessel or pontoon designs. The means for preventing submersion reviewed here also are contemplated for other watercraft designs that differ from the designs specifically claimed and for other problems such as compensating for wave activity from storms. However watercraft having enclosed hulls can most benefit from these means.

G. Flat Bottom and Convex-Shaped Floating Skis

The use of a single support member is preferred when complete submersion is desired to place the propeller further below the surface, or when the added friction of a second support member is undesired. In this instance, one, or more preferably two floating skis are attached by strut(s) to the bottom of the platform.

Figure 7:
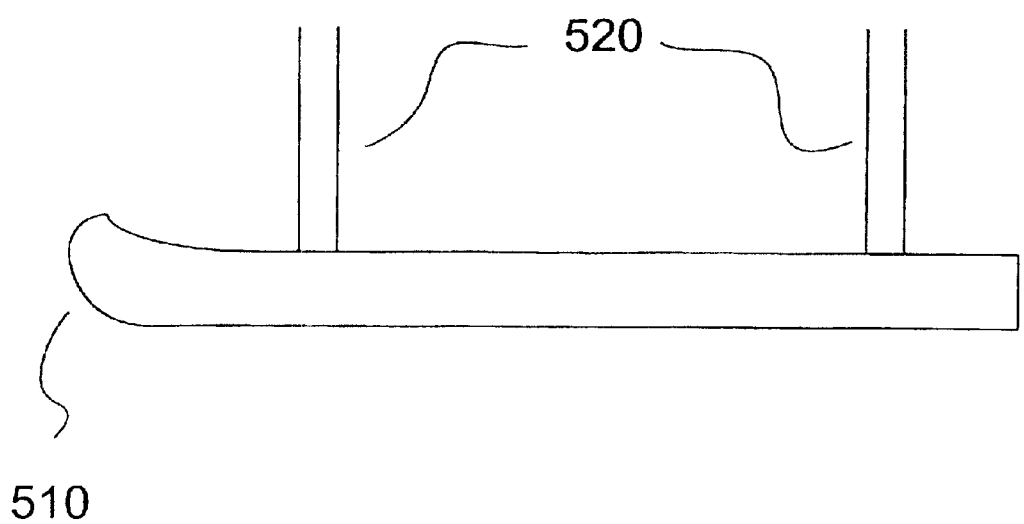
FIGS. 7a and 7b show side and cross-sectional views respectively, of preferred skis shapes.
Figure 7:
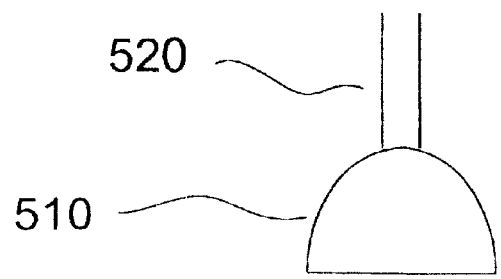

Each ski preferably has a rounded leading edge. A convex shape as described for the support member, is preferred for the skis. The skis preferably has a generally flat bottom (i.e. suitable for the skis to ride above the water surface during motion) as shown in FIGS. 7a and 7b. The preferred convex shape allows the skis to sit in the water during rest while interacting minimally with surface waves for greater stability. The generally flat bottom can be modified as known to the skilled artisan, for example by adding a vertical fin or ridge or a shallow hollow as can be seen in commercially available water skis. During forward motion, the skis skim on top of the water surface by virtue of the rounded leading edge and the flat shaped bottom, and should have minimal mass.

H. Adjust Skis Buoyancy for Optimum Stability and for Steering

According to one embodiment, support member buoyancy is controlled by pumping air or water in or out such that during rest, the support member contains greater mass than during motion. A water pump is preferred for this purpose and may, for example, be located within the skis itself or the support member, with a hose connecting the pump to a ballast reservoir within the skis. Preferably, the ballast reservoir comprises at least 10% of the skis volume and the increased mass from added water is distributed either in the middle of the skis or along its length.

In a preferred embodiment, the optional skis ballast is used for steering. In this case, the ballast preferably is located in the front half of the skis, and more preferably close to the leading edge. In operation, a turn left is accomplished by adding weight to the front of the left skis (pumping water into the front chamber) while the watercraft moves forward. A turn right is accomplished by adding weight to the right skis. Other useful combinations and permutations, such as for example, removing weight from the right skis, or shifting weight from the right skis front to its rear to turn left, readily will be apparent to the skilled artisan.

I. Adjust Skis Alignment for Steering

One embodiment favored for small personal (one or two rider) watercraft having one support member and two skis is to alter skis alignment with respect to the support member for steering. Normally, skis are parallel to the support member but a left or right turn occurs by rotating the skis with respect to the support member. To turn left, the skis are turned left with respect to the support member. To turn right, the skis are turned right. Most preferably the operator of the watercraft mechanically rotates the skis by moving a handlebar or wheel connected to the front portion of each skis and by shifting his/her weight. The handlebar or wheel pivots around a post from the forward strut of the support member. In another embodiment the skis movement may be combined with redirecting the thrust vector of the propulsion unit, which preferably is an impeller. Similar steering systems are known for other personal vehicles such as skidoos converted motorbikes and the like that maneuver in the snow. This embodiment particularly is desirable for an "electric jet skis" less than twelve feet long that is contemplated by the inventors.

J. Propulsion Unit Inside Support Member(s) or Floats

Another preferred feature is placement of a propulsion unit inside a support member(s) and a propeller at the stern end of a support member. In some embodiments, one or more propulsion units may be placed inside the float(s) as well. For example, a houseboat according to the invention may have a large motor inside a central support member and smaller motors in two laterally arranged floats.

K. Combine with Photovoltaics for Lone Voyages

One embodiment is a single support member having lateral stabilizer fins, and one or more struts that hold up a photo voltaic array platform above the water for supplying energy to the motor. Also preferred is a foldable photo voltaic array for storage in an un-extended form during storm activity.

In a preferred embodiment the platform comprises a cabin with a roof covered with solar cells. The sides of the cabin include window(s) and/or other openings that preferably are covered with solar cell panels that can swing up and lock into place in a horizontal or angled direction to allow collection of sunlight energy while being able to swing down and cover the windows/openings in times of severe weather.

L. Combine With an "Enhanced Solar" Reflector

Figure 8:
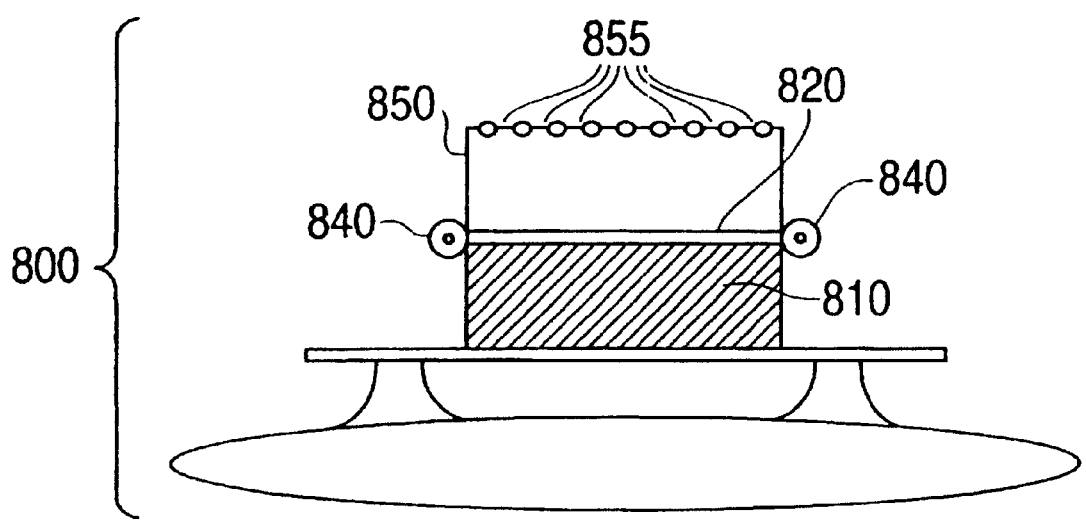
FIG. 8 shows a watercraft equipped with an enhanced solar reflector according to an embodiment of the invention.

Another embodiment is combination of a horizontal solar panel (that preferably is less than 30 degrees inclination to the horizon) with a reflective screen or wall that preferably is tilted at an angle for gathering light by reflection into the solar panel as exemplified in FIG. 8. FIG. 8 depicts an "enhanced solar" electric watercraft that optionally comprises a heavy power supply in a support member. Most preferably the horizontal solar panel(s) are mounted on the roof of the watercraft cabin and the enhanced solar reflector is a thin material that is unrolled from one edge of the solar panel and extends upwards. In another embodiment the solar reflector is an array of slats, which may be fabric or of a more durable material such as hard plastic or aluminum, and which are tilted manually, or preferably by a servo, to optimally reflect sunlight onto a solar panel. The reflector may be flat but preferably will have a contour along either x, y or both xy axes with the edge(s) closer to the sun than the center, in order to focus the sun's rays onto a solar panel. For example, panel 910 shown in FIG. 9 could be bent with its center moved to the left, or alternatively, the angle of tilt for reflector vanes 920 could vary from top to bottom or from the center out to the top and bottom to achieve this effect. By having a contour, the area of the reflector can be larger than the area of the solar panel, to allow higher light intensities to fall upon the solar panel. The surface may be silvery (mirrored).

Figure 9:
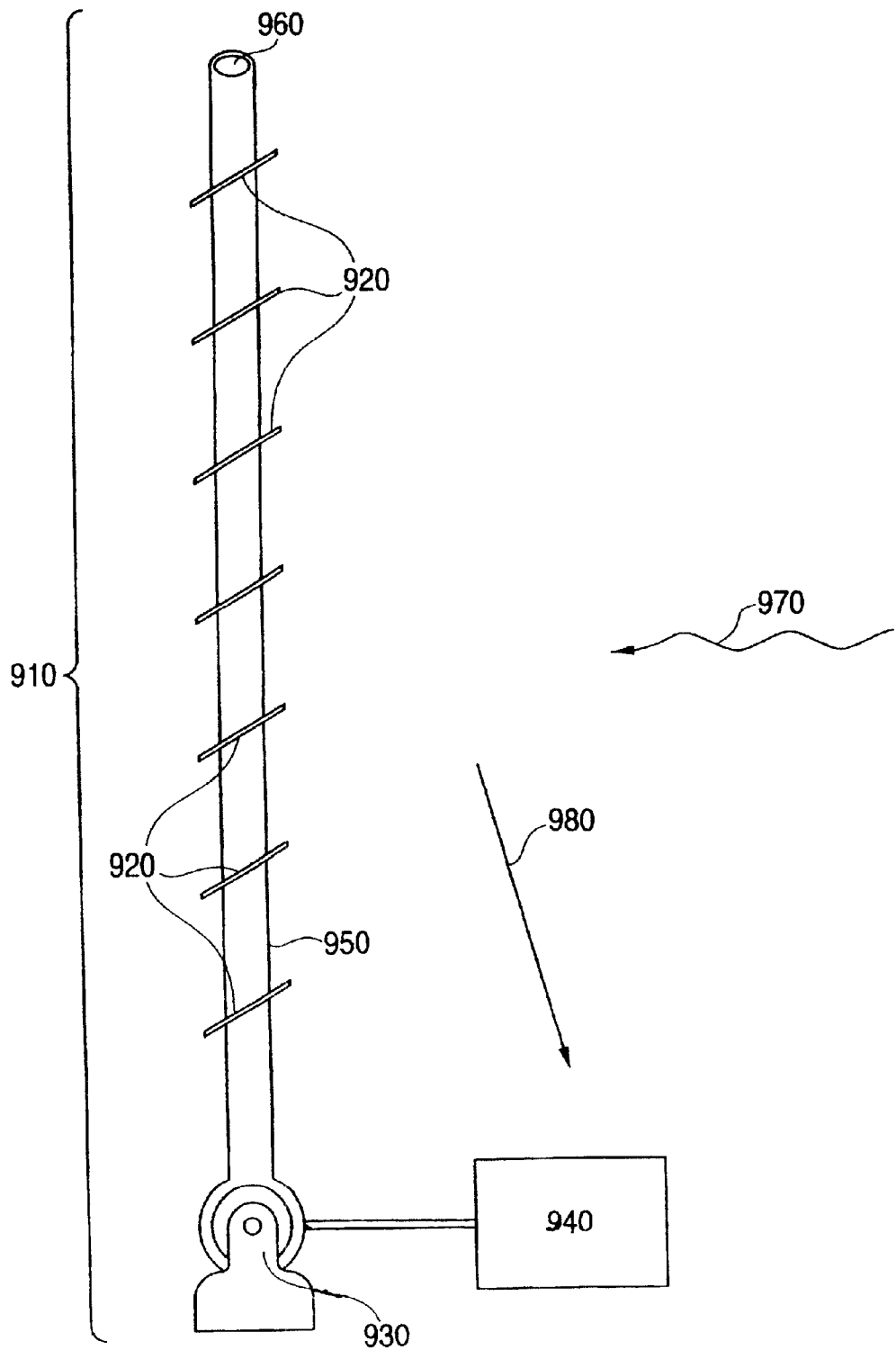
FIG. 9 shows the side view of an enhanced solar reflector according to an embodiment of the invention.

Suitable reflector screen materials and mechanisms are known as exemplified by U.S. Pat. Nos. 5,730,666, 5,729, 926, 5,694,711, 5,551,177, 4,833,838, and 4,187,332. FIG. 8 shows reflectors 840 that fasten to one or more positions 855 on frame 850 for reflective capture of Sun rays. In the early morning the screen preferably is in a low angle less than 45 degrees to the horizontal but is raised as the sun ascends. The embodiment shown in FIG. 8 depicts mounting positions 855 for use with either enhanced solar reflector 840 but other mechanical and electrical arrangements for controlling the position of the reflector can be used. FIG. 9 shows detail for an alternative venetian blinds style of reflector 910 that allows some air movement between reflector vanes 920, while providing servo gearing mechanism 930 to automatically tilt the reflective vanes using linkage 950 in response to sun movement according to feedback circuit 940 that monitors the output from the solar panel and one or more directional light sensors (not shown) to correct for the passing of clouds. Linkage 950 is a closed loop that winds around pivot 960 and may be an elastic material or may have one or more springs within its length to allow sudden opening of one or more vanes 920 in response to wind gusts. In this drawing light ray 970 reflects off of 910 down to a horizontal solar panel (not shown) positioned to the right and bottom of 910.

In most preferred embodiments the reflective material of the screen is porous, allowing air to flow to alleviate sail effects. The screen may be a fibrous or porous material. Suitable fabrics that are both highly reflective and porous to air are known or can be easily prepared by skilled artisans. Fabrics are known that contain reflective substances such as a multitude of glass or ceramic microspheres, phosphates, titanium dioxide, metal coated microspheres and the like as, for example described by the above cited patents and by U.S. Pat. Nos. 5,200,262, 5,812,317, 5,976,669, 5,988,820 and 5,513,789. U.S. Pat. No. 4,032,681 shows how to make a reflective fabric comprising a base fabric covered with a thin originally continuous reflective layer that has been extensively fractured. The fractures provide porosity but leave the fabric with a high reflectivity. Yet further examples of fabric material that can be used for an enhanced solar reflector can be found in U.S. Pat. Nos. 5,656,355, 5,599,585, 4,508,776, 4,418,110 and 4,230,763.

In one embodiment the reflective fabric or solid material reflects light in a directed, non-diffuse manner and can be positioned for maximum transfer of sunlight into the solar panel(s). In an embodiment a space is maintained between the lower edge of the reflector and the solar panel to allow wind pressure to escape at the bottom. In another embodiment one or more openings are present in the fabric to allow wind to more easily pass through the reflector. For example, the fabric or hard material may contain a plurality of elongated slots which permit passage of air and thus prevent wind damage, as described by U.S. Pat. No. 4,186,912. Most preferably, the slats are tensioned (held in position) by a gearing mechanism or other mechanism such as a rubber or plastic pulley which gives way and allows the slats to rotate in response to wind, thus allowing strong gusts of wind to momentarily move the slats out of position to prevent the wind from pushing full force on the structure and damaging it.

Most preferably the reflective screen is both porous and has one or more openings to minimize interaction with wind. In one embodiment however, the screen is non porous and has a dual use as a sail. In yet another embodiment the screen is porous and allows air passage when dry but becomes substantially less porous and more sail-like when wetted. In the latter embodiment the operator of the watercraft can wet the reflective screen when desired to use the screen as a sail. The sail can be maintained in the wet state by spraying water onto it. A polymeric absorbent may be included in the screen material to hold water and maintain the decreased air permeability for a longer period of time. Such polymeric absorbents variously known as "super slurpers" are known. A preferred polymer that may be covalently attached to the screen material is polyacrylamide. Such polymers and/or chemical reactions for their attachment to other materials such as fabric are known, particularly as water holding agents in the disposable diaper art. The immobilized polymer works for the present invention by filling spaces in the reflector where the absorbent becomes wet and swells up. The absorbent shrinks when it dries, and reforms the pores.

Although the above discussion is presented in the context of mass stabilized electric boats it is emphasized that the preparation and use of an "enhanced solar reflector" also is intended for and is independently useful for a wide variety of applications that employ solar panels. Such intended applications include other watercraft, recreational vehicles, remote mountain cabins, apartment and school building rooftops and the like. In some cases, particularly for a small apartment dweller in a big city, a horizontal solar collector is not practical and an enhanced reflector is needed to bring in solar radiation to a surface such as a vertical wall. An engineer can optimize location and position based on the specific requirements as needed. Accordingly, this embodiment of the invention specifically is intended for those other diverse applications as well. The U.S. patent applications recited in this section are particularly incorporated by reference in their entireties as space limitations prevent the incorporation of further detail into the present specification.

Figure 2:
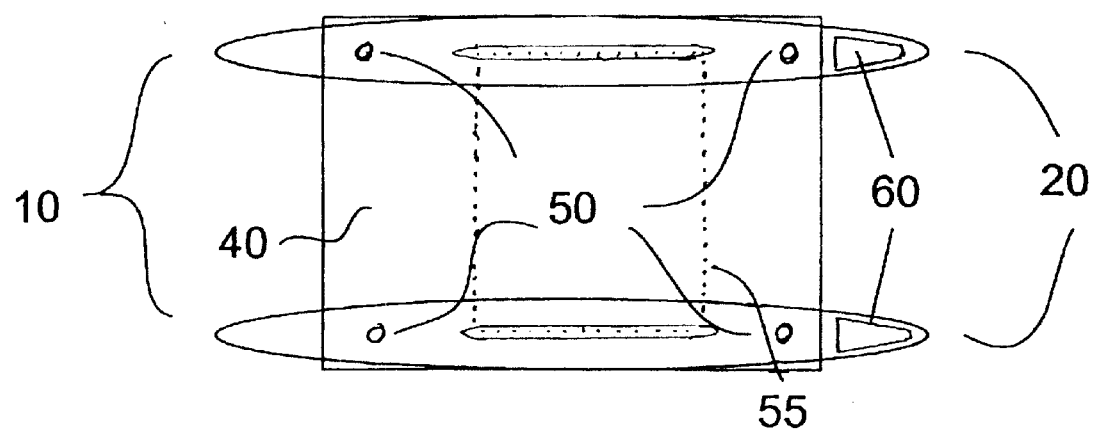
FIG. 2 is a top view of a diving watercraft having a short platform held above two longer support members by struts on each support member. The platform is enclosed on all four sides and top, with an opening in its bottom (not shown).

M. Place a Center Support Underwater with Two Parallel Floats at the Water Surface The embodiment of a central support member with two parallel floats such as skis or pontoons is particularly useful for larger watercraft such as a houseboat. This embodiment alleviates the problem of a houseboat being unstable due to its high center of gravity compared to its center of buoyancy. According to this embodiment a low energy density power mass is placed into a preferably tapered but optionally straight central support member that has great negative buoyancy and which is completely submerged. In one embodiment the central support member is completely submerged and may be below the water surface by a small distance, such as 1 foot or more, for a large sized craft such as a houseboat. Preferably the mass of the support member exceeds the platform mass. The platform dimensions can be arranged to adjust the center of gravity to below the center of buoyancy. For increased strength, the strut(s) may be extended horizontally along the long axis of the support member, and/or floating skis. In a preferred embodiment the strut(s) that connect the central support member will present a large vertical surface to waves while the lateral skis do not, as shown in FIG. 2.

The two parallel floats provide buoyancy for the platform. In preferred embodiments, for greater stability the parallel floats also provide buoyancy to counteract a massively weighted central support member. In a particularly preferred embodiment, the central support member contains a large propulsion unit and the entire low energy density power source. The floats in this case preferably are tapered with a convex surface to allow low resistance in the water. By way of example a houseboat according to this embodiment may have a 35 foot long center support unit that is conical and tapered at each end and positioned so that the top of the support unit is one foot below the water and the unit has a 5 foot radius at its middle. Five thousand pounds of lead acid batteries and a 100 horsepower motor are placed within the propulsion unit. The parallel floats are each spaced 9 feet apart from the support member (total width of 18 feet) and, like the support member, also are tapered with a convex surface. The floats are 35 feet long. Both the floats and the support member hold up a platform with rooms in it, by a series of struts 3 feet long. The platform and the walls of the room preferably contain a light material such as polyurethane that provides insulation and flotation.

A houseboat with this conformation will have low resistance to low speed below about 12 knots. Most importantly, the center of gravity, depending on the height and weight of the platform with rooms, will be close to or even below the center of buoyancy. Thus, compared to a houseboat of the same dimensions made from two pontoons, a houseboat according to the present invention will be more resistant to wave action and could even be used in the ocean. A houseboat according to this embodiment of the invention preferably is less than 50 feet long, more preferably less than 40 feet long, more preferably less than 35 feet long and even more preferably less than 30 feet long. The houseboat may include a propulsion unit at the rear of each float to assist steering and maneuvering during docking.

Definitions of Terms Used

The following definitions are provided to assist the reader in understanding how to make and use the invention and to understand the scope of the claims.

Batteries refers to a low density power source which typically is an electric battery such as a series of lead-acid, nickel metal hydride, lithium, nickel cadmium, other metal hydride or (less preferably) other cells such as fuel cells. The less preferred fuel cells may comprise physically separated natural gas or hydrogen power supplies. In one embodiment a fuel cell is used to provide electricity and the hydrogen, natural gas or other fuel is stored within the support member(s). This latter embodiment provides the advantage of safety and increases commercial acceptability of fuel cells for marine use.

In 2000 a low energy density power source such as metal hydride or lead acid cell battery typically yielded much less than 1 kilowatt hour of energy per 10 pounds in a fully charged, or utilizable state. Batteries or other fuel cells that will be developed in the future however, may exceed this energy density, yet are still considered "low energy density" compared to hydrocarbon fuels. That is, such batteries also are considered to be a low density power source because their energy densities are lower than equivalent volume sized hydrocarbon fuel sources such as gasoline or diesel fuel. Rapid advances in batteries and other low energy density power supplies will allow greater energy storage (for example up to 0.5 kilowatt hour per pound of mass is conceivable). By comparison gasoline contains about 13,540 watt hours of energy per kilogram mass (about 5 kilowatt hours per pound) and lithium batteries contain about 400 watt hours per kilogram mass (about 0.15 kilowatt hours per pound). Thus, low energy density power supplies generally are at least 10 times less energy dense than gasoline. According to present technology such sources are at least 30 times less energy dense. Even moderately low energy density power supplies to be developed in the future (0.5 kilowatt hour per pound) are highly desirable when combined with other features as taught herein if their weight is used to help weight down one or more support members.

Convex means curved outward, as the exterior of a sphere, but may have discontinuous and flat portions as long as those portions do not present a concave surface that is capable of holding water that may fall upon it.

Elongated float is a pontoon or floating ski with a convex surface and provides floatation. In a preferred embodiment the elongated float does not contain a massive power source.

Platform is a horizontal support held above the submersible portion (i.e. one or more support members) and, where used, above one or more floating skis. Preferably, the platform is held far enough above the submersible portion such that at least 25% and more preferably more than half of wave energy underneath the platform substantially pass between the submersible portion and the platform. The platform preferably is flat and in that configuration presents low wind resistance. The platform is part of the watercraft that a passenger rides on or in and preferably has seat(s) attached. The term "platform" in this context means the load bearing structure, and does not include an added part such as a long windshield or air fairing that may be added to reduce wind resistance or added for some other reason.

In one embodiment the platform is merely a chair held above at least one support member. In another embodiment the platform comprises rooms of a houseboat. The length of the platform (in the same dimension as the long dimension of the support members) preferably is less than the length of its support member(s) by at least one strut length and more preferably less by at least two strut lengths. Strut length in this context means the average vertical height of the strut(s) connected to the floating skis or pontoons if present, or connected to the support members (if skis not present). For the embodiment where one support member and one floating skis are attached to the platform, the term "strut length" means the average of struts connecting the platform to the support member and to the floating skis. In the inventors' experience, the best length is partly determined by how long the struts are. A longer strut requires a shorter platform to maintain stability.

Propulsion Unit is a motor that turns a propeller or impeller, and is linked to a source of energy such as a battery, gas tank, hydrogen fuel cell, and the like. Most preferred is an electric motor, combined with solar electric energy, with a battery backup for times of low solar radiation. In a less preferred embodiment other motors, such as hydrogen powered, or diesel powered motors are acceptable when combined with a heavy mass as described herein. In the case of diesel or another motor that burns oxygen, the motor preferably is within a support member and a snorkel extends above the surface to bring air to the motor. Also preferred is a hydrogen motor that uses atmospheric oxygen to combine with hydrogen stored in a support member, and compressed gas for use during diving.

Preferably, a propulsion unit is located within the trailing point of one or more submersible members, as shown in the figures. Most preferably, a propeller is at the extreme tip of each member, and has a diameter that is not greater than the diameter of the fattest part of the submersible member. This orientation more closely matches the location and vector of the propulsion unit's perturbation on the water such that total perturbation of the water is minimized.

Strut means an elongated support, existing between and connecting a support member or elongated float to an overhead platform. A strut preferably has a mean diameter or thickness (width perpendicular to the direction of motion) that is less than 20% its mean length. The length of each strut preferably is at least 6 inches and in some cases may be more than 2, 3, 4, 5 or 6 feet long. A strut may extend part of the way along the axis of the support member to which it is attached. The struts hold up the platform so preferably at least some wave energy can travel unimpeded through the space created by the strut. In one embodiment, such struts are attached to two floating skis that are laterally arranged outside of a central support member and the support member is connected to a platform via a continuous fin or other vertical part that may expose considerable vertical surface to waves. The term "at least some wave motion to pass unimpeded" means that at least 20%, preferably more than 40% and more preferably more than half, and most preferably more than 75% of energy from a wave perpendicular to (and having an amplitude equal to or less than) the support member (or elongated float) travels unimpeded.

Support member means an elongated closed structure that sits in water and presents a convex shape at its upper surface. The support member is submerged at least 40% by volume, preferably at least 50%, more preferably at least 75%, and depending on other control structures that may exist on the watercraft, preferably is more than 85% submerged. A support member, in every embodiment that includes it, is connected to the platform by one or more struts and the support member contains a low energy density power source.

Examples of Combined Features as Shown in the Figures

Turning now more specifically to the figures, representative embodiments of the invention will be further explained as being applicable to a wide variety of watercraft, ranging from personal watercraft less than 15 feet long to houseboats.

Cruise Boat

FIG. 1 shows cruise boat 310 that can travel faster than its calculated hull speed. Hull speed is the speed in knots obtained by multiplying the square root of the length of the hull at the waterline (in feet) times 1.34. For example, a 16 foot long waterline vessel watercraft has a calculated hull speed of 5.36 knots. Cruise boat 310 may be taken apart, transported on top of a car, and stored in a garage for convenience to a big-city dweller. Centrally located support member 320 comprises batteries 350 and propulsion motor 360. This example has two fin-like struts 347 that attach support member 320 to platform 340. Platform 340 is drawn as a rectangle in this figure but in the preferred embodiment where the watercraft is taken apart for easy storage and transport, the platform may comprise a strong net or fabric that is held taught by a frame. In another embodiment the fabric is very porous when wet but becomes much less porous by virtue of attached water swellable polymer, as described for the enhanced solar reflector embodiment. In the latter case, a polymer-fabric should be chosen that is light weight and easily folded when dry but during use becomes wet, and becomes more stiff and impermeable, to give the look and feel of a more solid floor to the user.

The support member struts may form a single long strut extending along most of the support member upper surface. In the latter embodiment the long strut optionally contains one or more openings in its wall/vertical surface to allow at least some wave motion energy to pass through the watercraft. In an embodiment, also not shown here, an electric generator powered by a small gasoline motor provides electricity to supplement and recharge the batteries. Preferably, the fossil fuel powered electrical generator will have a power output that is less than the maximum power input of the electric motor, and more preferably is less than half of that maximum power input.

Floating skis 330 is on each side of support member 320. Each floating skis is attached to platform 340 by fin-like struts 345. In another embodiment not shown here, struts 345 resemble posts lacking a fin-like shape and that interact less with waves that travel perpendicular to the long axis of the floating skis. In yet another embodiment both struts 345 on each floating skis form a single elongated strut that extends along at least half the length of the floating skis. The single elongated strut may have one or more openings in it to allow wave energy to pass.

A watercraft depicted in FIG. 1 typically is less than 30 feet long and is small enough to be pulled on a trailer behind a car. Preferably the watercraft is less than 25 feet long, more preferably less than 18 feet long, and even more preferably less than 14 feet long and is transportable on top of a car.

Diving Boat

FIG. 2 shows watercraft 10 that can cruise both at the surface of the water and below the water surface. This diving boat can be launched from shore, can transport one or more skin divers from the shore to a diving site and then can dive below the surface while maintaining an air filled cabin at ambient pressure. In this embodiment the low density power source not only stabilizes the watercraft but also provides distributed weight to allow submersion of the air filled cabin.

Diving boat 10 has two support members 20 that hold up platform 40 by struts 50 and 55. For strength, struts 50 are elongated and extend along the support members beneath cabin 70. Struts 50 attach support members 20 to platform 40 outside of the cabin region. In one embodiment (not shown) struts 50 and 55 are merged as a continuous long strut between each support member 20 and platform 40. Each support member comprises propulsion unit 60. In this preferred example support members 20 are 16 feet long, platform 40 is 10 feet long by 8 feet wide and the lower part of cabin 70 that is attached to platform 40 is 4 feet wide by 3 feet long. Propulsion units 60 are 5 kw electric motors.

Figure 3:
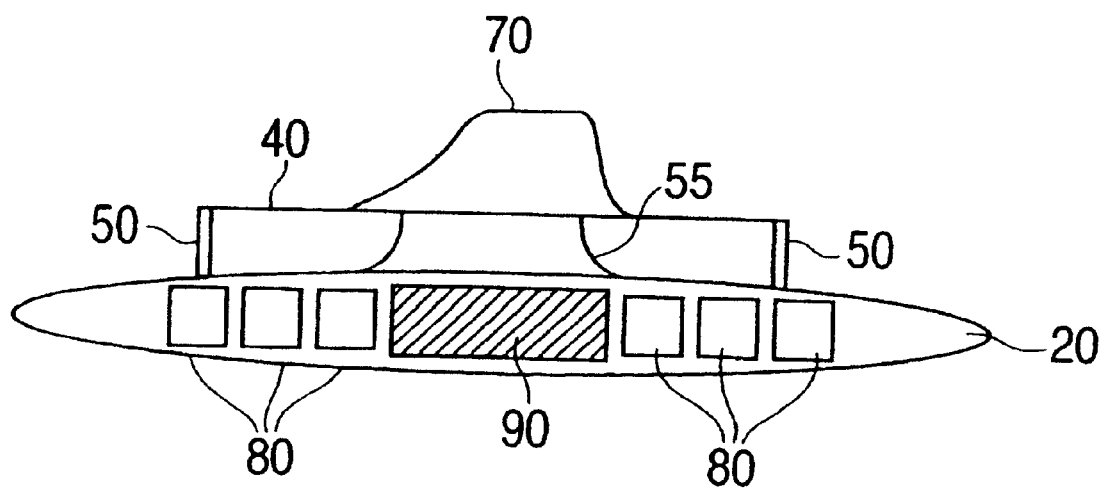
FIG. 3 is a side view of the watercraft of FIG. 2.

FIG. 3 shows a side view of the diving boat. Support member 20 as seen in this figure comprises lead acid batteries 80 in the front and rear and further comprises large ballast air space 90 in its center region. The total weight of batteries 80 in each support member is approximately 900 pounds and the total available buoyancy of large ballast air space 90 is approximately 1800 pounds (approximately 30 cubic feet). Struts 50 and 55 provide a vertical length of 30 inches between support member 20 and platform 40. This vertical length provides space for a diver to enter and exit the bottom of cabin 70 through an opening (not shown) by swimming below platform 40 when dive boat platform 40 is submerged. Note that the hatch is between and above both support members 20 and the watercraft always maintains this egress space for safety. In another preferred embodiment platform 40 has a hatch (not shown) to the rear of cabin 70, and a skin diver can enter cabin 70 prior to diving via dropping through the hatch and entering the cabin while the platform is held above the water surface.

During use large ballast air space 90 within each support member 20 is purged by adding air to displace water and the buoyancy provided thereby maintains the platform above the water surface. At least one means to prevent submersion of the platform preferably is used during forward movement provided by propulsion units 60. The large lead acid battery mass of 1800 pounds provides over 30 kilowatt hours of electrical power, allowing expenditure of 10 horsepower for at least one hour in each direction to a desirable dive site off shore. The passenger(s) may ride within or on cabin 70 or on platform 40. To dive, air is purged from ballast air space 90 within each support member 20 and a net negative buoyancy of approximately 1800 pounds is created, allowing submersion of air filled cabin 70.

In another embodiment for increased safety, the weight of low density power supply 80 is supplemented by lead or iron bars that are mechanically releasable from inside cabin 70 for emergency ascent to the surface. In one embodiment the total mass of the removable lead bars exceeds the battery mass to allow greater manual control of the dive boat buoyancy. In yet another embodiment a single massive support member is used directly underneath the platform instead of the two support members and two water skis are provided, which may have inflatable portion(s) extending parallel to and on each side of the support member.

The inventors emphasize that the dimensions and weights given here are representative and that a large variety of shapes and sizes can be used. Such combinations are derivable by those who have constructed, used or considered the construction of a diving watercraft. For example, the Sportsub (TM) sold by International Venture Craft Corp. (Vancouver Canada) uses primarily a large metal ballast to submerge an air filled chamber that is at ambient pressure and wherein a skin diver may enter and exit by swimming into and out of the bottom of the air chamber. The Sportsub is smaller than many embodiments contemplated for the present invention and requires a special pontoon boat, inflatable launch recovery boat or crane to maneuver out of the water. As exemplified by the Sportsub (TM), however, a skilled artisan readily can add air tanks and buoyancy-controls to an ambient pressure diving boat.

In a preferred embodiment of a dive boat, the lower part of the cabin normally remains submerged when at rest. This leaves a greater amount of space in the support members to accommodate the low density power source because less air is needed in the support members during operation at the water surface (non-submerged state). In some embodiments that employ a greater proportion of the support member for the low density power source, (or alternately, a weight ballast such as lead or iron bars) a watercraft is provided having smaller outside dimensions for a given air cabin size.

By keeping the lower part of the cabin submerged when not moving, smaller support members may be used. In this embodiment the cabin itself may be the platform. According to this embodiment, a diving boat as small as 9 feet long can be constructed, and if only one-passenger is contemplated, an even smaller dive boat can be made having an air space that accommodates one person.

In each case, it is preferred that the top of the cabin be covered by a fixture such as a railing, folding chair or other device to allow a passenger to sit on top of the watercraft while cruising at the surface. If desired, the thrust of the motors can be adjusted, or a planing surface can be added to allow the watercraft to ride high with respect to the water surface when moving. That is, in one embodiment the watercraft remains at least partially submerged when at rest and during forward movement the boat cabin comes out of the water by hydroplaning of the support members and/or optionally attached water skis.

Sail Boat

Figure 4:
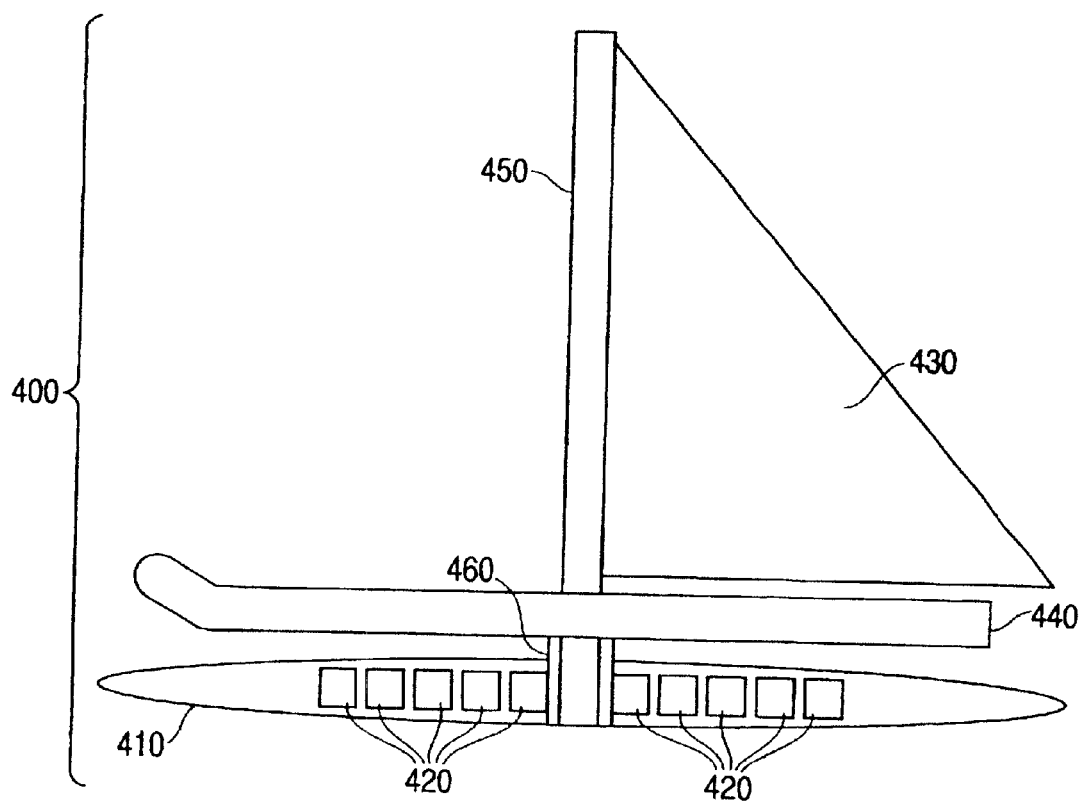
FIG. 4 is a side view of a sailing watercraft that has a short draft and which is suitable for shallow waters.

FIG. 4 shows sailboat 400. In this embodiment low energy density power mass 420 within central support member 410 stabilizes sail 430 and allows the sailboat to enter very shallow water, unlike typical sailboats that use a long central rudder or deep ballast to lower the center of gravity. This feature of the invention allows sailboating in shallow draft waters such as in southern Florida that normally are too shallow for sailboats.

Support member 410 contains batteries 420 and is attached to platform 440 via struts (not shown). Two floating skis 430 are laterally arranged above support member 410 and contribute at least 50%, preferably at least 75% and more preferably 100% of the sailboat's floatation. This watercraft has a center of gravity below its center of buoyancy and tends to right itself when tipped in a strong wind. Sail 430 is attached to platform 440 by mast 450. Mast 450 is removable and positionable into post 460 that serves as a strut connecting platform 440 to support member 410. Support member 410 is very long with a small diameter. The maximum diameter of the support member is less than 12 percent of the length of the support member and, in other embodiments is less than 10% of that length. The floating skis are positioned above the support member so that in normal use the support member is completely submerged. In one embodiment the height of the floating skis above the support member is adjustable and can be increased for sailing in locations of greater water depth. This adjustment increases self righting behavior by lowering the massive battery mass in deeper water.

Means to Prevent Platform Submersion

Mass stabilized watercraft according to the invention tend to have less displacement compared to vessel watercraft for the same carrying capacity and generally need one or more means to prevent unwanted submersion of the platform. Although the means described herein primarily are intended for incorporation into watercraft of the invention, it will be readily appreciated that these means are suitable for other watercraft as well.

Figure 5:
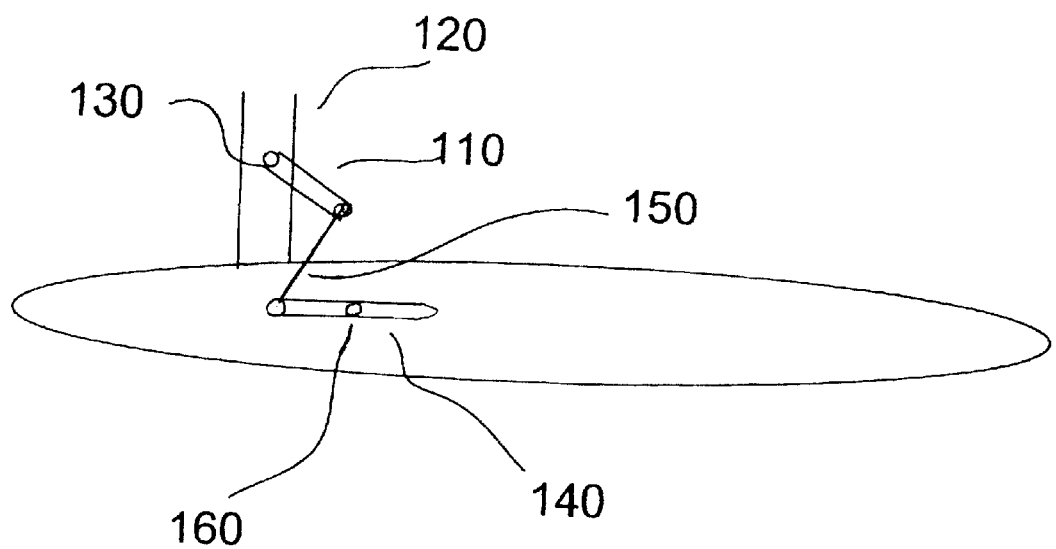
FIG. 5 shows a representative control surface deflector linkage means to prevent complete submersion.
Figure 6:
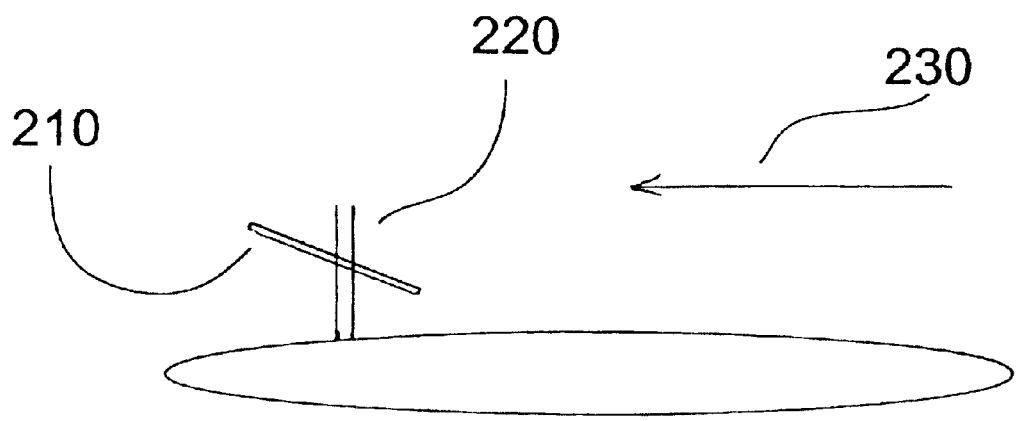
FIGS. 6a and 6b show a passive deflector means to prevent complete submersion.
Figure 6:
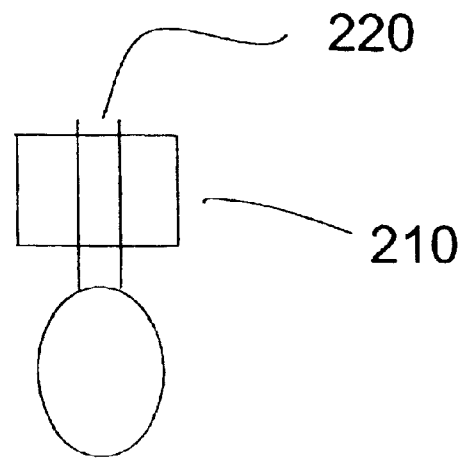

FIGS. 5 and 6 show representative means to prevent submersion of the platform. FIG. 5 is a side view showing forward strut 120 with pivotally attached deflector component 110 that swings backwards upon contact with water. The end of component 110 opposite pivot pin 130 is mechanically attached via cable 150 to horizontal fin 140. Horizontal stabilizer fin 140 pivots about pin 160. During normal conditions when the craft moves forward, the water level and waves are below component 110. When the watercraft pitches down, or submerges in the water during forward motion, component 110 receives the force of water movement and pivots back, actuating linkage 150, which forces horizontal fin 140 to pivot about pin 160. As a result, horizontal fin 140 presents a different attack angle to the onrushing water, forcing the bow of the watercraft up, and alleviating pressure upon component 110.

In FIG. 6, stationary force deflector 210 is connected to forward strut 220 at an angle as shown. During normal forward movement shown by arrow 230, deflector 210 is out of the water. However, when the watercraft pitches down, or submerges in the water during forward motion, deflector 210 collides with the water surface, pulling up the bow of the watercraft. FIG. 6a is a side view and FIG. 6b is a front view showing the width of deflector 210.

FIGS. 7a and 7b show an embodiment of floating skis 510 that provides low friction to the water surface. FIG. 7a is a side view showing a typical curve at the anterior part of the ski, which allows the skis to ride over the surface. Struts 520 are attached to the top of the ski. FIG. 7b is a cross section view showing a representative convex shape that provides low interaction with waves. In the depicted embodiment, the ski bottom is flat. In preferred embodiments for use in a houseboat, the elongated float departs from this ski shape and has a more rounded bottom as a generally tapered or straight shaped hull.

FIG. 8 is a side view of a watercraft that comprises an enhanced solar reflector for improved solar electric efficiency. Watercraft 800 includes cabin 810 having horizontal roof 820 with solar panels (not shown) affixed to the top. The ends of enhanced solar reflectors 840 can be seen at the left and right extremities of roof 820. Although not seen in this side view, solar reflectors 840 are rolled up curtain shade-like, and extend along the side of the roof, that is along the z axis into and out of the plane of this view. Attached to roof 820 is frame 850 having a top region with solar reflector mounts 855 spaced along its length. During operation when the sun is shining from the right side as shown, reflector 840 on the left side is pulled up. The top edge (not shown) of reflector 840 is attached to frame 850 at one of solar reflector mounts 855. When the sun is shining from the left side, the reflector 840 on the left side is not used and the reflector 840 on the right side is pulled up. This embodiment is particularly preferred for long voyages where the watercraft direction remains constant with respect to the sun for extended time periods.

Conclusion

The broadest features of preferred embodiments of the invention are useful for a variety of watercraft and the inventors have attempted to explain them by way of example and by embodiments that can be used alone or in combination. The inventors most prefer the use of their invention as stabilized (a) cruising watercraft, (b) diving watercraft and (c) sailboats, and examples have been offered in these areas. At the same time, the inventors have discovered further new features that are now made possible by the invention. For example, a watercraft according to the invention interacts less with the water surface by not creating a huge standing wave and thus can more easily detect wave motion created by storms. This opens up new methods, some of which include use of a computer, for monitoring storm activity and automatically controlling a watercraft for avoiding storms and for responding to existing storms. Another example is that the more stable (bouncing around less in the water) watercraft of the invention can utilize enhanced solar reflectors, which respond to changes in solar radiation more reliably. Accordingly, embodiments are presented for improving solar panels, which although applicable to watercraft also can be used at other locations such as buildings. Other combinations of the inventive features described herein, of course can be easily determined by a skilled artisan after having read this specification, and are included in the spirit and scope of the claimed invention. The references cited above are specifically incorporated in their entireties by reference and represent art known to the skilled artisan. Priority document 09/252,038 specifically is incorporated by reference in its entirety.

We claim:

1. A sailboat comprising:
   (a) an elongated submerged central support member having an upper surface and at least one strut or must attached to the upper surface;
   (b) an electric motor and a low energy density power source within the support member, wherein the low energy density power source comprises at least 25% of the total watercraft weight;
   (c) two elongated floats one of each side of the central support member, each float having an upper surface with at least one strut attached to the upper surface; and
   (c) a platform attached to the upper ends of the struts and held above the support member and float(s).

2. The sailboat of claim 1, wherein the floating skis contribute at least 50% of the sailboat's floatation.

3. The sailboat of claim 1, having a center of gravity that is below its center of 4. The sailboat of claim 1, wherein the upper surfaces of the two elongated floats are convex.

5. The sailboat of claim 1, further comprising at least one mechanism for preventing submersion of the platform, the mechanism comprising at least one of: a horizontal stabilizer operably connected to a movable deflector, the movable deflector affixed to the watercraft above the waterline; a passive mechanical force deflector affixed to the front half of the watercraft and that automatically pulls the front of the watercraft up upon collision with waves; a bow-mounted propeller having a thrust that inclines and that is controlled by a submersion monitoring system; monitoring watercraft depth electronically and compensating by stopping the watercraft, decreasing the watercraft speed, shifting weight distribution in the watercraft and/or steering the watercraft to compensate the detected vertical movement; an inclined surface at the leading edge of the platform forces the watercraft up upon collision with the water; and flotation material with the platform.

6. A computer controlled watercraft comprising at least two sensors at separate locations on the watercraft, a computer and an actuator, wherein the sensors detect wave height with respect to a position on the watercraft, the sensors provide signals to the computer and the computer outputs a response useful for correcting the watercraft speed, depth, direction or attitude, and wherein the response is at least one of: a rudder movement; a ballast shift; a motor speed change; and a motor thrust vector change.

7. The computer controlled watercraft of claim 6, wherein the watercraft further comprises speed and direction sensors that provide watercraft speed and direction related signals that are input into the computer, and wherein the computer utilizes the watercraft speed and direction signal information to determine the output response.

8. The computer controlled watercraft of claim 6, wherein the watercraft comprises at least three sensors for detecting wave height at separate locations on the watercraft.

9. The computer controlled watercraft of claim 6, wherein the watercraft comprises at least four sensors for detecting wave height at separate locations on the watercraft.

10. The computer controlled watercraft of claim 6, wherein the sensors utilize an electronic means for detecting waves.

11. The computer controlled watercraft of claim 6, wherein the watercraft comprises at least 2 struts and each of at least two sensors is located on a different strut.

12. The computer controlled watercraft of claim 6, wherein the computer contains an algorithm that accepts wave height, wave speed, and wave direction and uses this information to adjust boat trim.

13. The computer controlled watercraft of claim 6, wherein the computer compares the time between signals from the sensors to determine the relative speed and direction of a wave, and outputs signals to steer the watercraft into the wave.

14. The computer controlled watercraft of claim 6, wherein the watercraft comprises at least two vertically arranged sensors at each of at least 3 separate locations on the watercraft, wherein the vertically arranged sensors at each location create an electrical signal in response to wave height activity.

15. An electric powered watercraft having at least one enclosed cabin capable of traveling in seas with waves that exceed 3 feet high comprising;

(a) an elongated submerged support member that comprises more than 25% of the watercraft weight, having an upper surface, and at least one strut attached to the upper surface;

(b) at least two floats having upper surfaces and at least one strut attached to each upper surface, wherein the floats are positioned parallel to but above the submerged support member; and (c) a platform that comprises the cabin, such that the platform is attached to the upper ends of the struts and held above the support member and float(s), and wherein the platform and cabin can be submerged during normal operation.

16. The electric powered watercraft of claim 15, wherein each float comprises a propulsion unit.

17. The electric powered watercraft of claim 15, wherein the struts that hold the floats to the platform are movable and allow adjustment of the platform height above the floats.

18. The electric powered watercraft of claim 15 having a center of gravity that is at or below its center of buoyancy.

* * * * *